(12) United States Patent
Blum

(10) Patent No.: US 8,657,215 B1
(45) Date of Patent: Feb. 25, 2014

(54) WHEEL APPARATUS FOR AN IRRIGATION SYSTEM

(76) Inventor: Benjamin D. Blum, York, NE (US)

( * ) Notice: Subject to any disclaimer, the term of this patent is extended or adjusted under 35 U.S.C. 154(b) by 219 days.

(21) Appl. No.: 13/305,799

(22) Filed: Nov. 29, 2011

Related U.S. Application Data

(60) Provisional application No. 61/417,612, filed on Nov. 29, 2010.

(51) Int. Cl.
*B05B 3/00* (2006.01)

(52) U.S. Cl.
USPC ........... 239/726; 239/728; 239/735; 239/741; 239/742; 305/4; 301/43

(58) Field of Classification Search
USPC ......... 239/723, 726, 728, 731, 735, 741, 742, 239/744; 305/4, 111; 301/43, 52
See application file for complete search history.

(56) References Cited

U.S. PATENT DOCUMENTS

| | | |
|---|---|---|
| 489,400 A | 1/1893 | Wait |
| 1,106,841 A | 8/1914 | Porteous |
| 1,195,815 A | 8/1916 | Hightower |
| 1,284,385 A | 11/1918 | Linden |
| 1,387,225 A | 8/1921 | Allen |
| 3,866,836 A * | 2/1975 | Dowd ........................... 239/731 |
| 4,609,154 A * | 9/1986 | Rinkewich .................... 239/741 |
| 5,451,001 A | 9/1995 | Kumm |
| 7,775,610 B2 | 8/2010 | Mettenbrink |
| 2011/0121090 A1 * | 5/2011 | Price .............................. 301/43 |

OTHER PUBLICATIONS

"Aquagon Irrigation Wheels", http://www.aquagonirrigationwheels.com/ printed Mar. 15, 2012.

* cited by examiner

*Primary Examiner* — Steven J Ganey
(74) *Attorney, Agent, or Firm* — Advent, LLP

(57) ABSTRACT

A wheel apparatus includes a hub that is configured to be received by an axle of an irrigation system. The wheel apparatus also includes a rim assembly that includes a plurality of substantially flat feet that form a faceted circular arrangement. A support structure is disposed between the hub and the rim assembly to at least partially support the rim assembly. At least one of the substantially flat feet is coupled to at least one of the plurality of spoke structures. The wheel apparatus also includes at least one cleat disposed on an outside surface of at least one of the plurality of substantially flat feet to provide traction to the rim assembly.

20 Claims, 4 Drawing Sheets

WHEEL APPARATUS FOR AN IRRIGATION SYSTEM

CROSS-REFERENCE TO RELATED APPLICATIONS

The present application claims the benefit under 35 U.S.C. §119(e) of U.S. Provisional Application Ser. No. 61/417,612, entitled WHEEL APPARATUS FOR AN IRRIGATION SYSTEM, filed on Nov. 29, 2010. U.S. Provisional Application Ser. No. 61/417,612 is herein incorporated by reference in its entirety.

BACKGROUND

Irrigation systems, such as center pivot irrigation systems and linear move irrigation systems, include one or more wheels to facilitate the movement of the overhang assemblies of the irrigation systems and provide support for the overhang assembly. However, an irrigation system may become immobilized when one or more wheels of the irrigation system get stuck in a semi-solid surface, such as mud, or the like.

SUMMARY

The present disclosure is directed to a wheel apparatus for an irrigation system. The wheel apparatus includes a hub that is configured to be received by an axle of the irrigation system. The wheel apparatus also includes a rim assembly that includes a plurality of substantially flat feet formed in a faceted circular arrangement. A support structure is disposed between the hub and the rim assembly to at least partially support the rim assembly. The wheel apparatus also includes at least one cleat disposed on an outside surface of at least one foot of the plurality of substantially flat feet to provide traction to the rim assembly.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

The numerous advantages of the present disclosure may be better understood by those skilled in the art by reference to the accompanying figures in which.

DETAILED DESCRIPTION

It will be understood that when an element is referred to as being "connected" or "coupled" to another element, it can be directly connected or coupled to the other element or intervening elements. In contrast, when an element is referred to as being "directly connected" or "directly coupled" to another element, there are no intervening elements present. Further, as used herein the term "plurality" refers to at least two elements. Additionally, like numbers refer to like elements throughout.

Figure 1:
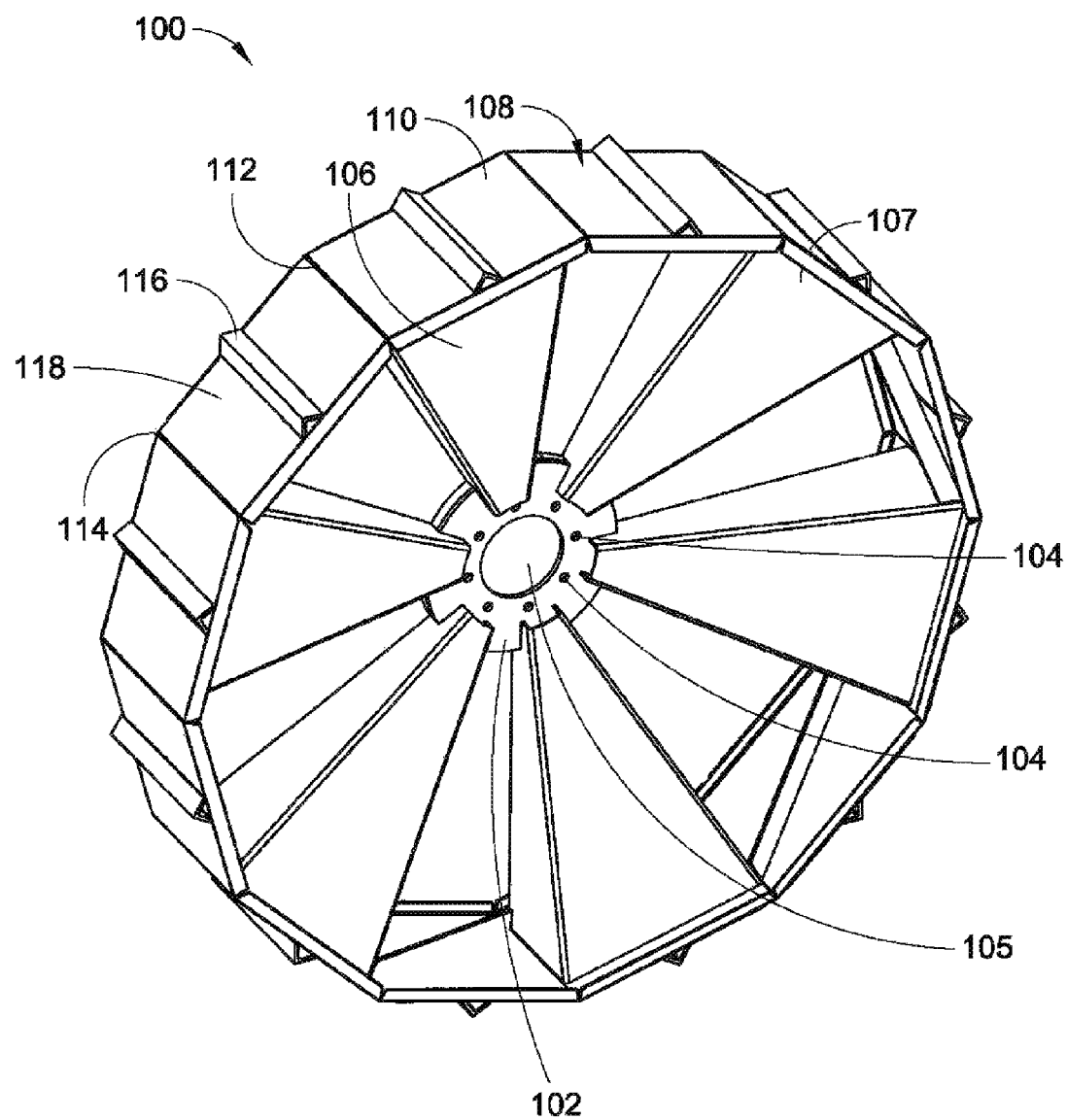
FIG. 1 is a diagrammatic isometric view of a wheel apparatus in accordance with the present disclosure.
Figure 2:
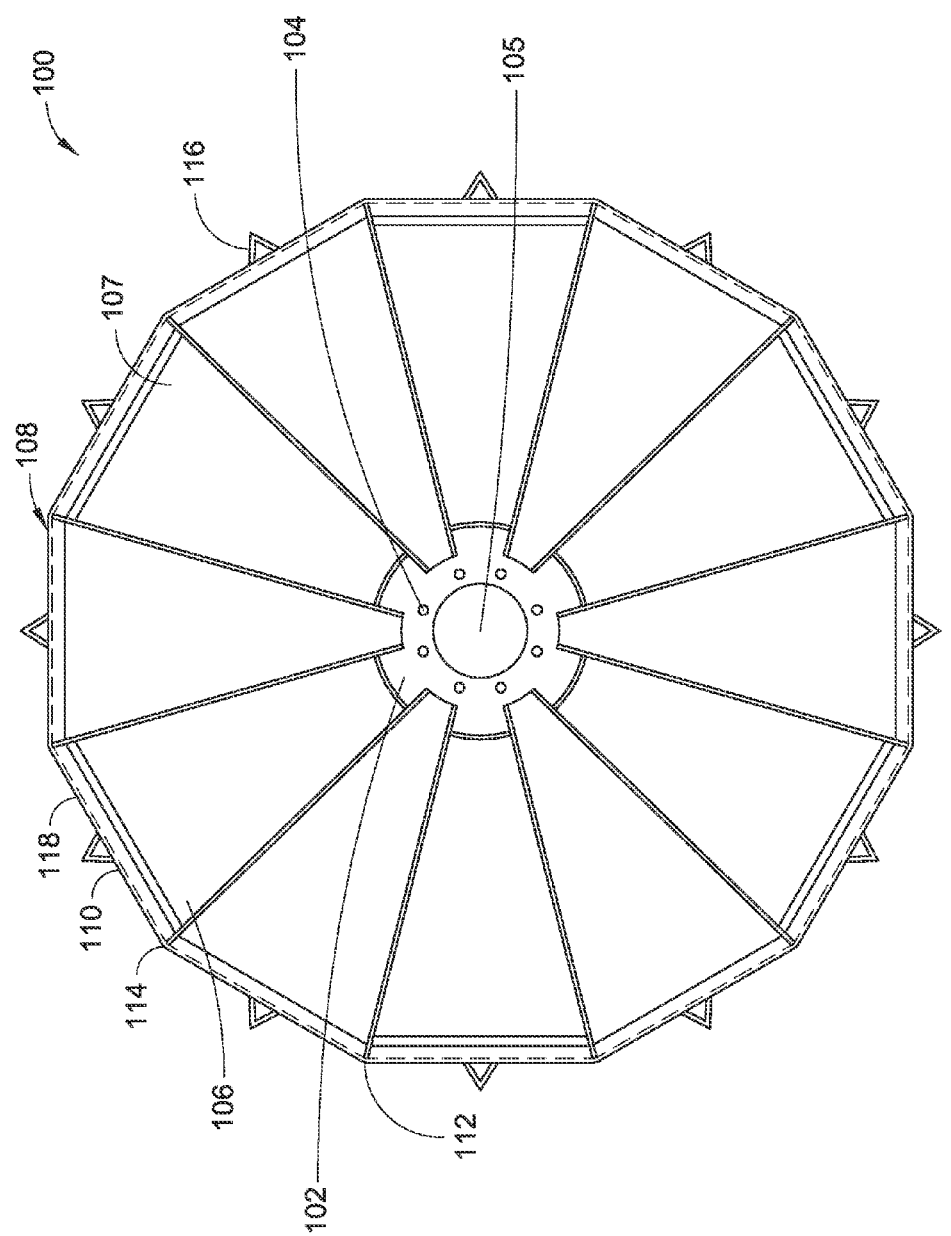
FIG. 2 is a schematic side view of the wheel apparatus illustrated in FIG. 1.
Figure 3:
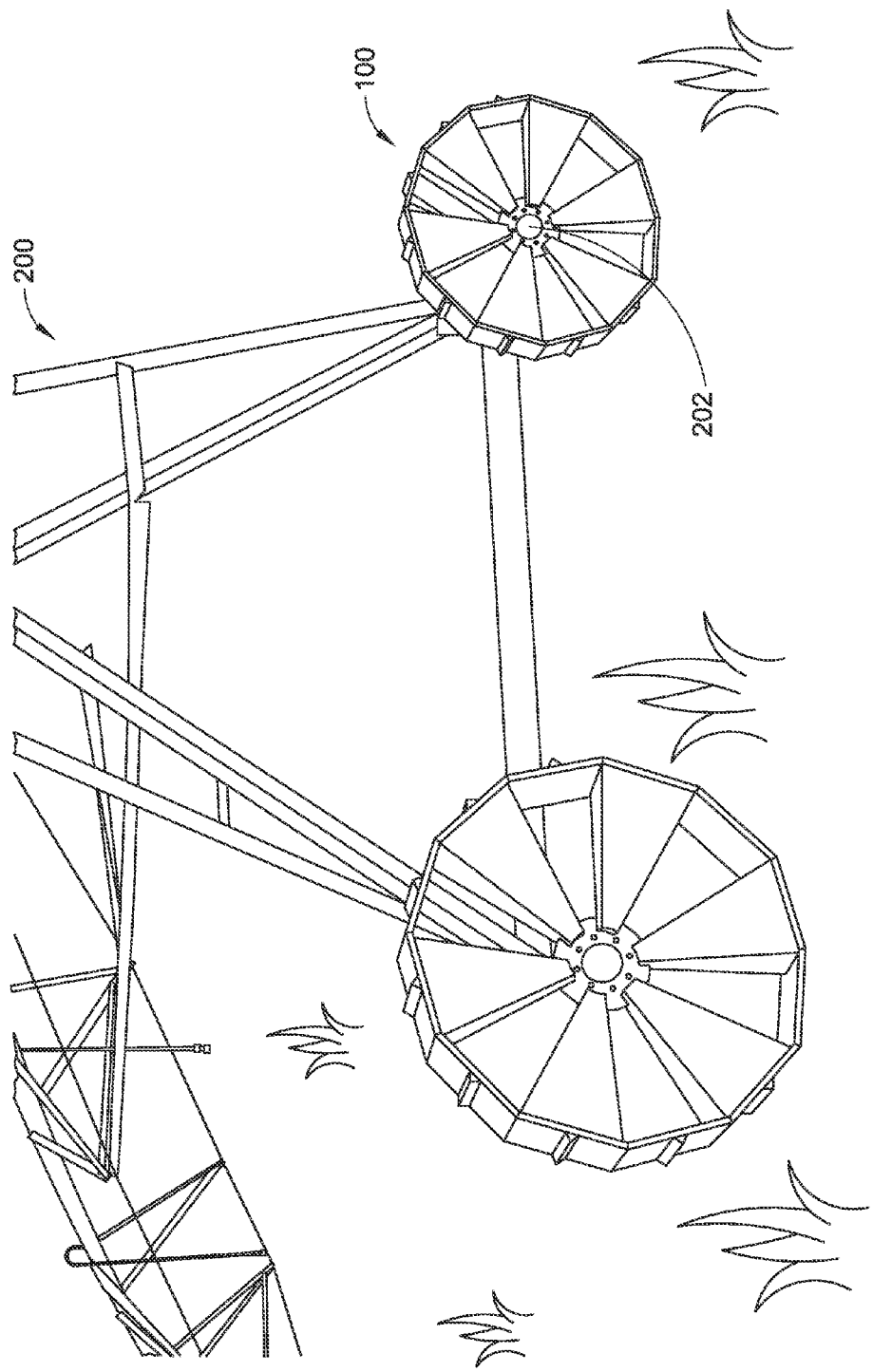
FIG. 3 is an environmental view of the wheel apparatus as illustrated in FIGS. 1 and 2, wherein the wheel apparatus is coupled to an axle of an irrigation system.

FIGS. 1 through 3 illustrate an example implementation of a wheel apparatus 100 configured to be received by an irrigation system, such as irrigation system 200 (shown in FIG. 3). It is contemplated that the irrigation system 200 may include a self-propelled center pivot irrigation system or a self-propelled linear move irrigation system. The irrigation system 200 is configured to irrigate land, such as farmland, by distributing applicant (e.g., water, etc.) to the land. As shown in FIG. 1, the wheel apparatus 100 includes a hub 102. The hub 102 provides coupling functionality with an axle 202 of the irrigation system 200. For example, the hub 102 includes a plurality of apertures 104 that are configured to be received by fasteners (e.g., screw, bolt, etc.) of the axle 202 to allow an operator to couple the hub 102 to the axle 202. The hub 102 also includes an aperture 105 that is configured to be received by an axle 202 of the irrigation system 200 (see FIG. 3).

The wheel apparatus 100 also includes a support structure 106 disposed between the hub 102 and a rim assembly 108. The support structure 106 is configured to at least partially support the rim assembly 108. In an implementation, the support structure 106 may be a disc-shaped support structure extending from the hub 102 to the rim assembly 108. In another implementation, the support structure 106 may comprise a plurality of spoke structures 107 that are coupled to the hub 102 and are directed radially outward from the hub 102. Moreover, the spoke structures 107 are configured to run along an axial direction with respect to the direction of wheel apparatus 100 rotation. The spoke structures 107 may be welded, fused, or the like, to the hub 102. Furthermore, the spoke structures 107 may be manufactured from sheet metal or the like and manipulated to form various types of spoke structure 106 configurations. In an implementation, the wheel apparatus 100 may comprise six (6) spoke structures as illustrated in FIGS. 1 and 2. However, it is contemplated that other spoke structure 106 configurations may be implemented without departing from the spirit of the present disclosure.

Figure 4:
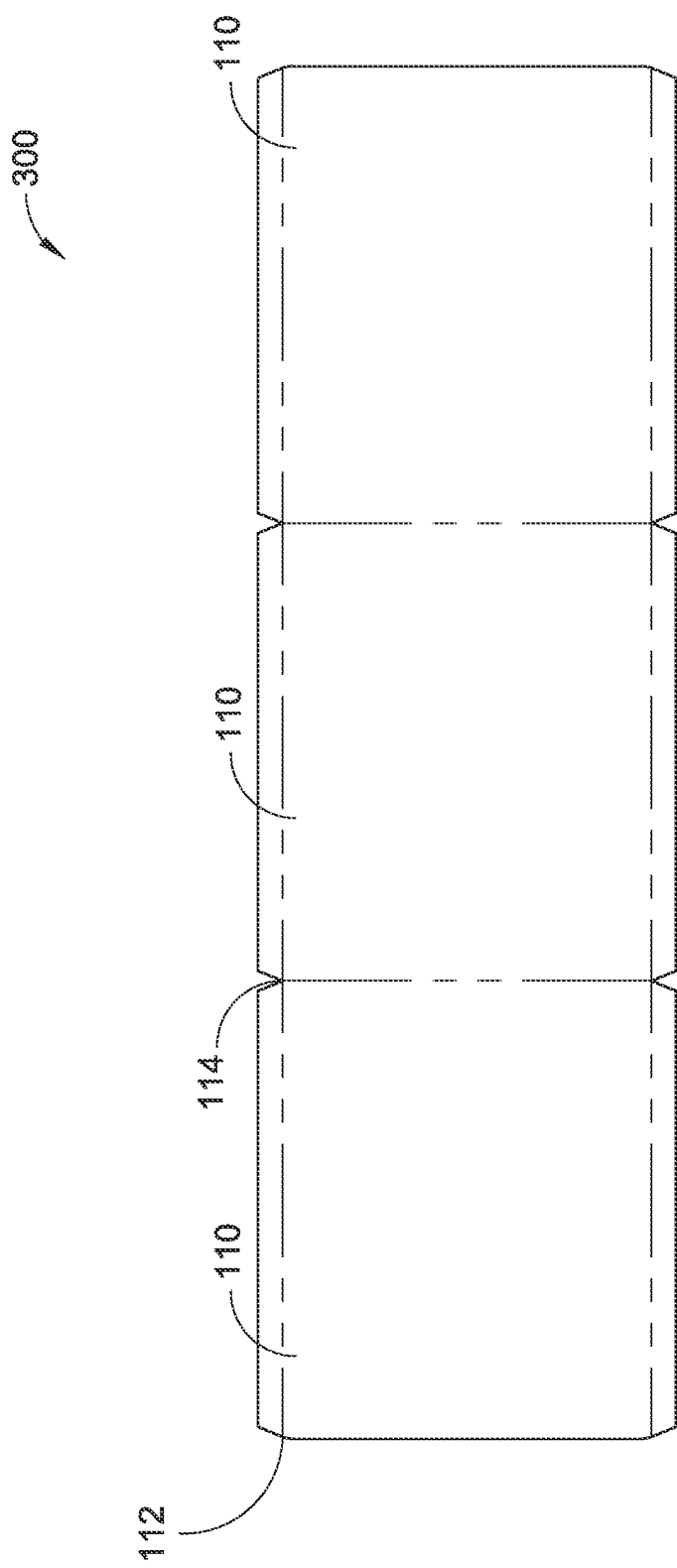
FIG. 4 is schematic view of a bend pattern utilized to form the rim assembly of the wheel apparatus of the present disclosure.

As illustrated in FIGS. 1 and 2, the wheel apparatus 100 also includes the rim assembly 108 that comprises a plurality of at least substantially flat feet 110. The plurality of at least substantially flat feet 110 are configured to form a faceted circular arrangement, and each foot 110 includes first and second ends 112, 114. In an implementation, the rim assembly 108 may comprise twelve (12) at least substantially flat feet 110 that are configured to form a faceted circular arrangement akin to a dodecagon configuration as illustrated in FIGS. 1 through 3. In an implementation, a spoke structure 106 may be coupled to every other foot 110; however, it is contemplated that other spoke structure 106 configurations may be utilized. The rim assembly 108 may be constructed according to the bend pattern 300 (e.g., a sheet metal bend pattern) illustrated in FIG. 4.

The wheel apparatus 100 also includes at least one cleat 116 disposed on an outer surface 118 of at least one foot 110 as illustrated in FIGS. 1 and 2. The cleat 116 provides traction to the rim assembly 108. It is contemplated that the cleat(s) 116 may be manufactured in a unitary implementation with rim assembly 108 or manufactured separately and then coupled (e.g., welding, etc.) to the rim assembly 108. In an example implementation, each foot 110 includes a cleat 116 disposed on the outside surface 118 of the foot 110. In a further implementation, the cleat 116 may be comprised of a hollow pyramidal shaped cleat. However, it is contemplated that other cleat 116 configurations may be utilized without departing from the spirit of the present disclosure. In yet a further implementation, the cleat 116 may be disposed on the outer surface 118 approximately equidistant between first and second ends 112, 114 as illustrated in FIGS. 1 and 2.

It is contemplated that the wheel apparatus 100 may be manufactured from a rust resistant material such as galvanized steel, or the like. Moreover, the rust resistant material may cause the wheel apparatus 100 to have a weight that is heavier than other wheels (i.e., rubber tires, etc.) utilized with irrigation systems, such as irrigation system 200. The potentially heavier weight may cause a foot 110 of the wheel apparatus 100 to have more surface area contact with a surface (e.g., uneven ground surface, even ground surface, etc.) when the foot 110 is in surface engagement with the surface (e.g., ground) to provide better traction to wheel apparatus 100.

While the foregoing written description of the disclosure enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

What is claimed is:

1. A wheel apparatus for an irrigation system, the wheel apparatus comprising:
   a hub configured to couple with an axle of the irrigation system;
   a rim assembly including a plurality of at least substantially flat feet, the plurality of at least substantially flat feet each including a first end and a second end, the plurality of at least substantially flat feet arranged in a faceted circular arrangement, the first end and the second end each formed at a respective junction between one at least substantially flat foot and another at least substantially flat foot;
   a support structure disposed between the hub and the rim assembly, the support structure configured to at least partially support the rim assembly, the support structure comprising a plurality of spoke structures disposed between the hub and the rim assembly, the plurality of spoke structures directed radially outward from the hub, each spoke structure tapering from the hub to an outer edge that extends along a respective substantially flat foot from the first end to the second end for supporting the respective substantially flat foot; and
   at least one cleat disposed on an outside surface of at least one at least substantially flat foot of the plurality of at least substantially flat feet.

2. The wheel apparatus as recited in claim 1, further comprising a cross-member extending substantially perpendicular to a plane defined by an inner surface of the at least one substantially flat foot, the cross-member extending between a first spoke structure and a second spoke structure.

3. The wheel apparatus as recited in claim 1, wherein the plurality of spoke structures comprises 6 spoke structures.

4. The wheel apparatus as recited in claim 1, wherein the at least one cleat comprises a hollow pyramidal shaped cleat.

5. The wheel apparatus as recited in claim 1, wherein the at least one cleat is disposed approximately equidistant between the first end and the second end of the at least one at least substantially foot of the plurality of at least substantially flat feet.

6. The wheel apparatus as recited in claim 1, wherein the hub, the support structure, the rim assembly, and the at least one cleat is manufactured from galvanized steel.

7. The wheel apparatus as recited in claim 1, wherein each at least substantially flat foot of the plurality of at least substantially flat feet include a cleat.

8. A wheel apparatus for an irrigation system comprising:
   a hub configured to couple with an axle;
   a plurality of spoke structures coupled to the hub, the plurality of spoke structures directed radially outward from the hub;
   a rim assembly including a plurality of substantially flat feet, the plurality of substantially flat feet each including a first end and a second end, the first end and the second end each formed at a respective junction between one at least substantially flat foot and another at least substantially flat foot, the plurality of at least substantially flat feet arranged in a faceted circular arrangement and at least one at least substantially flat foot of the plurality of at least substantially flat feet coupled to at least one spoke structure of the plurality of spoke structures, each spoke structure tapering from the hub to an outer edge that extends along a respective substantially flat foot from the first end to the second end for supporting the respective substantially flat foot;
   at least one cleat disposed on an outside surface of at least one of the plurality of at least substantially flat feet; and
   a cross-member extending substantially perpendicular to a plane defined by an inner surface of the at least one substantially flat foot, the cross-member extending between a first spoke structure and a second spoke structure.

9. The wheel apparatus as recited in claim 8, wherein the plurality of spoke structures comprises 6 spoke structures.

10. The wheel apparatus as recited in claim 8, wherein the at least one cleat comprises a hollow pyramidal shaped cleat.

11. The wheel apparatus as recited in claim 8, wherein the at least one cleat is disposed approximately equidistant between the first end and the second end of the at least one at least substantially foot of the plurality of at least substantially flat feet.

12. The wheel apparatus as recited in claim 8, wherein the hub, the plurality of spoke structures, the rim assembly, and the at least one cleat is manufactured from galvanized steel.

13. The wheel apparatus as recited in claim 8, wherein each at least substantially flat foot of the plurality of at least substantially flat feet include a cleat.

14. An irrigation system comprising:
   an irrigation assembly configured to irrigate land, the irrigation assembly including an axle;
   a wheel apparatus coupled with the axle, the wheel apparatus including:
      a hub configured to be received by the axle;
      a rim assembly including a plurality of at least substantially flat feet, the plurality of at least substantially flat feet each including a first end and a second end, the first end and the second end each formed at a respective junction between one at least substantially flat foot and another at least substantially flat foot, the plurality of at least substantially flat feet arranged in a faceted circular arrangement;
      a support structure disposed between the hub and the rim assembly, the support structure comprising a plurality of spoke structures disposed between the hub and the rim assembly, the plurality of spoke structures directed radially outward from the hub, each spoke structure tapering from the hub to an outer edge that extends along a respective substantially flat foot from the end to the second end for supporting the respective substantially flat foot;

a cross-member extending substantially perpendicular to a plane defined by an inner surface of the at least one substantially flat foot, the cross-member extending between a first spoke structure and a second spoke structure; and at least one cleat disposed on an outside surface of at least one at least substantially foot of the plurality of at least substantially flat feet to provide traction to the rim assembly.

15. The irrigation system as recited in claim 14, wherein the support structure comprises a plurality of spoke structures disposed between the hub and the rim assembly, the plurality of spoke structures directed radially outward from the hub.

16. The irrigation system as recited in claim 14, wherein the at least one cleat comprises a hollow pyramidal shaped cleat.

17. The irrigation system as recited in claim 14, wherein the at least one cleat is disposed approximately equidistant between the first end and the second end of the at least one at least substantially foot of the plurality of at least substantially flat feet.

18. The irrigation system as recited in claim 14, wherein the hub, the support structure, the rim assembly, and the at least one cleat is manufactured from galvanized steel.

19. The irrigation system as recited in claim 14, wherein each at least substantially flat foot of the plurality of at least substantially flat feet include a cleat.

20. The irrigation system as recited in claim 14, wherein the plurality of spoke structures comprise 6 spoke structures.

* * * * *